US007716571B2

(12) United States Patent
Tien et al.

(10) Patent No.: US 7,716,571 B2
(45) Date of Patent: May 11, 2010

(54) MULTIDIMENSIONAL SCORECARD HEADER DEFINITION

(75) Inventors: Ian Tien, Seattle, WA (US); Corey Hulen, Sammamish, WA (US); Chen-I Lim, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 213 days.

(21) Appl. No.: 11/412,434

(22) Filed: Apr. 27, 2006

(65) Prior Publication Data

US 2007/0265863 A1 Nov. 15, 2007

(51) Int. Cl.

| | |
|---|---|
| ***G06F 17/00*** | (2006.01) |
| ***G06F 3/048*** | (2006.01) |
| ***G06F 17/30*** | (2006.01) |
| ***G06F 11/34*** | (2006.01) |
| ***G06Q 10/00*** | (2006.01) |
| ***G06Q 30/00*** | (2006.01) |
| ***G07G 1/00*** | (2006.01) |
| ***H04M 3/51*** | (2006.01) |

(52) U.S. Cl. ....................... 715/212; 715/227; 715/825; 705/1; 705/10; 705/11

(58) Field of Classification Search ................. 715/825, 715/212; 705/1, 10, 11
See application file for complete search history.

(56) References Cited

U.S. PATENT DOCUMENTS 5,018,077 A 5/1991 Healey ....................... 715/509
5,253,362 A 10/1993 Nolan ........................... 707/1
5,473,747 A 12/1995 Bird ........................... 715/848
5,675,553 A 10/1997 O'Brien, Jr. et al. ........ 367/135
5,680,636 A 10/1997 Levine ....................... 715/512
5,758,351 A 5/1998 Gibson et al. ............... 707/104
5,797,136 A * 8/1998 Boyer et al. .................... 707/2
5,832,504 A 11/1998 Tripathi et al. .............. 715/235
5,845,270 A 12/1998 Schatz ......................... 706/11
5,926,794 A 7/1999 Fethe .......................... 705/11
5,956,691 A 9/1999 Powers .......................... 705/4

(Continued)

FOREIGN PATENT DOCUMENTS

EP 1 128 299 A1 8/2001

(Continued)

OTHER PUBLICATIONS

"SBM Solutions—Product Guide", SBM Associates, http://www.productcosting.com/prodguide.htm.

(Continued)

*Primary Examiner*—Joshua D Campbell
*Assistant Examiner*—Stephen Alvesteffer
(74) *Attorney, Agent, or Firm*—Merchant & Gould

(57) ABSTRACT

An object model and a user interface (UI) enable users of a scorecard application to define an order and categorization of elements including header and row components to break out the scorecard data for effective presentation of multidimensional scorecard views combined with data from non-multidimensional sources. Users are provided options to select individual or sets of members, or to provide queries that select sets of metrics for the scorecard view. Header components are defined at predetermined depth of layers enabling the user to view categorized metrics. Additional columns providing attribute information associated with the metrics can also be inserted in selected places within the scorecard matrix using the editing UI.

20 Claims, 10 Drawing Sheets

U.S. PATENT DOCUMENTS

| | | | | |
|---|---|---|---|---|
| 6,012,044 | A | 1/2000 | Maggioncalda et al. | 705/36 R |
| 6,023,714 | A | 2/2000 | Hill et al. | 715/235 |
| 6,119,137 | A | 9/2000 | Smith et al. | 715/234 |
| 6,141,655 | A | 10/2000 | Johnson | 707/2 |
| 6,163,779 | A | 12/2000 | Mantha | 707/100 |
| 6,182,022 | B1 | 1/2001 | Mayle et al. | 702/182 |
| 6,216,066 | B1 | 4/2001 | Goebel et al. | 701/29 |
| 6,230,310 | B1 | 5/2001 | Arrouye et al. | 717/136 |
| 6,233,573 | B1 | 5/2001 | Bair | 707/3 |
| 6,249,784 | B1 | 6/2001 | Macke | 707/3 |
| 6,308,206 | B1 | 10/2001 | Singh | 709/223 |
| 6,321,206 | B1 | 11/2001 | Honarvar | 705/7 |
| 6,345,279 | B1 | 2/2002 | Li et al. | 715/202 |
| 6,389,434 | B1 | 5/2002 | Rivette | 715/512 |
| 6,393,406 | B1 | 5/2002 | Eder | 705/7 |
| 6,421,670 | B1 | 7/2002 | Fourman | 707/10 |
| 6,493,733 | B1 | 12/2002 | Pollack | 715/513 |
| 6,516,324 | B1 | 2/2003 | Jones | 707/104.1 |
| 6,519,603 | B1 | 2/2003 | Bays | 707/102 |
| 6,529,215 | B2 | 3/2003 | Golovchinsky et al. | 715/764 |
| 6,578,004 | B1 | 6/2003 | Cimral | 705/36 |
| 6,628,312 | B1 | 9/2003 | Rao | 715/853 |
| 6,658,432 | B1 | 12/2003 | Alavi et al. | 707/104.1 |
| 6,677,963 | B1 | 1/2004 | Mani et al. | 715/764 |
| 6,687,878 | B1 | 2/2004 | Eintracht | 712/512 |
| 6,772,137 | B1 | 8/2004 | Hurwood et al. | 707/2 |
| 6,775,675 | B1 | 8/2004 | Nwabueze | 707/100 |
| 6,831,575 | B2 | 12/2004 | Wu et al. | 341/50 |
| 6,831,668 | B2 | 12/2004 | Cras | 715/853 |
| 6,842,176 | B2 | 1/2005 | Sang'Udi | 345/440 |
| 6,850,891 | B1 | 2/2005 | Forman | 705/7 |
| 6,859,798 | B1 | 2/2005 | Bedell et al. | 706/45 |
| 6,874,126 | B1 | 3/2005 | Lapidous | 715/711 |
| 6,898,603 | B1 | 5/2005 | Petculescu | 707/101 |
| 6,900,808 | B2 | 5/2005 | Lassiter | 345/440 |
| 6,959,306 | B2 | 10/2005 | Nwabueze | 707/104.1 |
| 6,963,826 | B2 | 11/2005 | Hanaman et al. | 703/2 |
| 6,968,312 | B1 | 11/2005 | Jordan | 705/7 |
| 6,973,616 | B1 | 12/2005 | Cottrille | 715/512 |
| 6,988,076 | B2 | 1/2006 | Ouimet | 705/7 |
| 6,995,768 | B2 | 2/2006 | Jou | 345/440 |
| 7,013,285 | B1 | 3/2006 | Rebane | 705/10 |
| 7,015,911 | B2 | 3/2006 | Shaughnessy et al. | 345/440 |
| 7,027,051 | B2 | 4/2006 | Alford et al. | 345/440 |
| 7,058,638 | B2 | 6/2006 | Singh | 707/100 |
| 7,181,417 | B1 | 2/2007 | Langseth et al. | 705/26 |
| 7,349,862 | B2 | 3/2008 | Palmer et al. | 705/7 |
| 7,412,398 | B1 | 8/2008 | Bailey | 705/10 |
| 7,440,976 | B2 | 10/2008 | Chan et al. | 707/203 |
| 7,496,852 | B2 | 2/2009 | Eichorn et al. | 715/764 |
| 7,509,343 | B1 | 3/2009 | Washburn et al. | 707/104.1 |
| 7,587,665 | B2 | 9/2009 | Crow et al. | 715/212 |
| 7,599,848 | B2 | 10/2009 | Wefers et al. | 705/7 |
| 7,613,625 | B2 | 11/2009 | Heinrich | 705/7 |
| 2001/0004256 | A1 | 6/2001 | Iwata et al. | 345/204 |
| 2001/0054046 | A1 | 12/2001 | Mikhailov et al. | 707/500 |
| 2002/0038217 | A1 | 3/2002 | Young | 705/1 |
| 2002/0049621 | A1 | 4/2002 | Bruce | 705/7 |
| 2002/0052740 | A1 | 5/2002 | Charlesworth | 704/220 |
| 2002/0059267 | A1 | 5/2002 | Shah | 707/100 |
| 2002/0078175 | A1 | 6/2002 | Wallace | 709/200 |
| 2002/0087272 | A1 | 7/2002 | Mackie | 702/14 |
| 2002/0091737 | A1 | 7/2002 | Markel | 707/513 |
| 2002/0099578 | A1 | 7/2002 | Eicher et al. | 705/7 |
| 2002/0133368 | A1 | 9/2002 | Strutt et al. | 705/1 |
| 2002/0169658 | A1 | 11/2002 | Adler | 705/10 |
| 2002/0169799 | A1 | 11/2002 | Voshell | 707/503 |
| 2002/0194042 | A1 | 12/2002 | Sands | 705/7 |
| 2002/0194090 | A1 | 12/2002 | Gagnon et al. | 705/27 |
| 2002/0194329 | A1 | 12/2002 | Alling | 709/224 |
| 2003/0004742 | A1 | 1/2003 | Palmer et al. | 705/1 |
| 2003/0028419 | A1 | 2/2003 | Monaghan | 705/10 |
| 2003/0040936 | A1 | 2/2003 | Nader et al. | 705/1 |
| 2003/0069773 | A1 | 4/2003 | Hladik et al. | 705/7 |
| 2003/0093423 | A1 | 5/2003 | Larason et al. | 707/5 |
| 2003/0110249 | A1 | 6/2003 | Buus et al. | 709/224 |
| 2003/0144868 | A1 | 7/2003 | MacIntyre et al. | 705/1 |
| 2003/0146937 | A1 | 8/2003 | Lee | 345/781 |
| 2003/0182181 | A1 | 9/2003 | Kirkwood | 705/11 |
| 2003/0187675 | A1 | 10/2003 | Hack | 705/1 |
| 2003/0204430 | A1 | 10/2003 | Kalmick et al. | 705/8 |
| 2003/0204487 | A1 | 10/2003 | Sssv | 707/1 |
| 2003/0212960 | A1 | 11/2003 | Shaughnessy et al. | 715/526 |
| 2003/0225604 | A1 | 12/2003 | Casati et al. | 705/7 |
| 2003/0226107 | A1 | 12/2003 | Pelegri-Llopart | 707/501.1 |
| 2004/0030741 | A1 | 2/2004 | Wolton et al. | 709/202 |
| 2004/0030795 | A1 | 2/2004 | Hesmer et al. | 709/231 |
| 2004/0033475 | A1 | 2/2004 | Mizuma et al. | 434/219 |
| 2004/0059518 | A1 | 3/2004 | Rothschild | 702/18 |
| 2004/0068429 | A1 | 4/2004 | MacDonald | 705/10 |
| 2004/0083246 | A1 | 4/2004 | Kahlouche et al. | 708/105 |
| 2004/0093296 | A1 | 5/2004 | Phelan et al. | 705/36 R |
| 2004/0102926 | A1 | 5/2004 | Adendorff | 702/182 |
| 2004/0117731 | A1 | 6/2004 | Blyashov | 715/507 |
| 2004/0128150 | A1 | 7/2004 | Lundegren | 705/1 |
| 2004/0138944 | A1 | 7/2004 | Whitacre | 705/11 |
| 2004/0162772 | A1 | 8/2004 | Lewis | 705/34 |
| 2004/0164983 | A1 | 8/2004 | Khozai | 345/440 |
| 2004/0172323 | A1 | 9/2004 | Stamm | 705/1 |
| 2004/0183800 | A1 | 9/2004 | Peterson | 345/440 |
| 2004/0204913 | A1 | 10/2004 | Mueller et al. | 702/188 |
| 2004/0210574 | A1 * | 10/2004 | Aponte et al. | 707/5 |
| 2004/0225571 | A1 | 11/2004 | Urali | 705/26 |
| 2004/0225955 | A1 | 11/2004 | Ly | 715/500 |
| 2004/0230463 | A1 | 11/2004 | Boivin | 705/7 |
| 2004/0230471 | A1 | 11/2004 | Putnam | 705/10 |
| 2004/0249482 | A1 | 12/2004 | Abu El Ata et al. | 700/44 |
| 2004/0252134 | A1 | 12/2004 | Bhatt et al. | 345/619 |
| 2004/0260582 | A1 | 12/2004 | King | 705/7 |
| 2004/0268228 | A1 | 12/2004 | Croney et al. | 715/255 |
| 2005/0012743 | A1 | 1/2005 | Kapler et al. | 345/419 |
| 2005/0039119 | A1 | 2/2005 | Parks et al. | 715/515 |
| 2005/0049894 | A1 | 3/2005 | Cantwell et al. | 705/1 |
| 2005/0055257 | A1 | 3/2005 | Senturk et al. | 705/8 |
| 2005/0060048 | A1 | 3/2005 | Pierre | 700/28 |
| 2005/0060325 | A1 | 3/2005 | Bakalash | 707/100 |
| 2005/0065967 | A1 | 3/2005 | Schuetze et al. | 707/102 |
| 2005/0071737 | A1 | 3/2005 | Adendorff | 715/500 |
| 2005/0091093 | A1 | 4/2005 | Bhaskaran | 705/7 |
| 2005/0091253 | A1 | 4/2005 | Cragun | 707/102 |
| 2005/0091263 | A1 | 4/2005 | Wallace | 707/102 |
| 2005/0097438 | A1 | 5/2005 | Jacobson | 715/500.1 |
| 2005/0108271 | A1 | 5/2005 | Hurmiz et al. | 707/102 |
| 2005/0114241 | A1 | 5/2005 | Hirsch | 705/35 |
| 2005/0114801 | A1 | 5/2005 | Yang | 715/961 |
| 2005/0149558 | A1 | 7/2005 | Zhuk | 707/104.1 |
| 2005/0149852 | A1 | 7/2005 | Bleicher | 715/501.1 |
| 2005/0154628 | A1 | 7/2005 | Eckart et al. | 705/10 |
| 2005/0160356 | A1 | 7/2005 | Albornoz | 715/512 |
| 2005/0171835 | A1 | 8/2005 | Mook | 705/11 |
| 2005/0198042 | A1 | 9/2005 | Davis | 707/10 |
| 2005/0216831 | A1 | 9/2005 | Guzik | 715/513 |
| 2005/0240467 | A1 | 10/2005 | Eckart | 705/10 |
| 2005/0256825 | A1 | 11/2005 | Dettinger | 707/1 |
| 2005/0272022 | A1 | 12/2005 | Montz, Jr. et al. | 434/322 |
| 2005/0273762 | A1 | 12/2005 | Lesh | 715/115 |
| 2005/0289452 | A1 | 12/2005 | Kashi | 715/512 |
| 2006/0004555 | A1 | 1/2006 | Jones | 340/525 |
| 2006/0004731 | A1 | 1/2006 | Seibel et al. | 707/3 |
| 2006/0009990 | A1 | 1/2006 | McCormick | 705/1 |
| 2006/0010032 | A1 | 1/2006 | Eicher et al. | 705/10 |
| 2006/0036455 | A1 | 2/2006 | Prasad | 715/1 |
| 2006/0059107 | A1 | 3/2006 | Elmore et al. | 705/64 |
| 2006/0089894 | A1 | 4/2006 | Balk et al. | 705/35 |

| | | | | |
|---|---|---|---|---|
| 2006/0089939 | A1 | 4/2006 | Broda et al. | 707/100 |
| 2006/0095915 | A1 | 5/2006 | Clater | 718/100 |
| 2006/0112123 | A1 | 5/2006 | Clark et al. | 707/101 |
| 2006/0112130 | A1 | 5/2006 | Lowson | 707/102 |
| 2006/0123022 | A1 | 6/2006 | Bird | 707/100 |
| 2006/0167704 | A1 | 7/2006 | Nicholls et al. | 705/1 |
| 2006/0178897 | A1 | 8/2006 | Fuchs | 705/1 |
| 2006/0178920 | A1 | 8/2006 | Muell | 705/8 |
| 2006/0195424 | A1 | 8/2006 | Wiest et al. | 707/3 |
| 2006/0206392 | A1 | 9/2006 | Rice, Jr. et al. | 705/26 |
| 2006/0229925 | A1 | 10/2006 | Chalasani et al. | 705/8 |
| 2006/0233348 | A1 | 10/2006 | Cooper | 379/265.06 |
| 2006/0235778 | A1 | 10/2006 | Razvi et al. | 705/35 |
| 2007/0033129 | A1 | 2/2007 | Coates | 705/36 R |
| 2007/0038934 | A1 | 2/2007 | Fellman | 715/700 |
| 2007/0050237 | A1 | 3/2007 | Tien et al. | 705/11 |
| 2007/0055688 | A1 | 3/2007 | Blattner | 707/102 |
| 2007/0174330 | A1 | 7/2007 | Fox et al. | 707/102 |
| 2008/0172287 | A1 | 7/2008 | Tien et al. | 705/10 |
| 2008/0172348 | A1 | 7/2008 | Tien et al. | 706/12 |
| 2008/0172414 | A1 | 7/2008 | Tien et al. | 707/104.1 |
| 2008/0172629 | A1 | 7/2008 | Tien et al. | 715/771 |
| 2008/0183564 | A1 | 7/2008 | Tien et al. | 705/11 |
| 2008/0184099 | A1 | 7/2008 | Tien et al. | 715/209 |
| 2008/0184130 | A1 | 7/2008 | Tien et al. | 715/745 |
| 2008/0189632 | A1 | 8/2008 | Tien et al. | 715/764 |
| 2008/0189724 | A1 | 8/2008 | Tien et al. | 719/329 |

FOREIGN PATENT DOCUMENTS

| | | | |
|---|---|---|---|
| EP | 1 050 829 | A2 | 3/2006 |
| WO | WO 97/31320 | A1 | 8/1997 |
| WO | WO 01/01206 | A2 | 1/2001 |
| WO | WO 01/01206 | A3 | 1/2001 |
| WO | WO 01/65349 | A1 | 9/2001 |
| WO | WO 01/69421 | A2 | 9/2001 |
| WO | WO 01/69421 | A3 | 9/2001 |
| WO | WO 03/037019 | A1 | 5/2003 |
| WO | WO 2004/114177 | A2 | 12/2004 |
| WO | WO 2004/114177 | A3 | 12/2004 |
| WO | WO 2005/062201 | A1 | 7/2005 |
| WO | WO 2005/101233 | A1 | 10/2005 |

OTHER PUBLICATIONS

"The Balanced Scorecard", Stakeholder, Jul. 2005, http://cc.msnscache.com/cache.aspx?q=2846702033267&lang=en-US&mkt=en-US&FORM=CVRE3.

"Enhanced Vendor Scorecards—Vendor Documentation," Business Analysis & Reporting, Publix Super Markets, Inc., Revised Date: Feb. 9, 2004, http://my.datexx.com/www/customer/p14/Vendor%20EVS%20Documentation.pdsf.

"Business Analysis with OLAP", Netways, http://www.netways.com/newsletter.olap.html, printed Mar. 7, 2006, 3 pp.

"Centralization and Optimization of Performance Metrics, Data Sources, and Analysis Activities", 2005 Computerworld Honors Case Study, http://www.cwhonors.org/laureates/Business/20055240.pdf, printed Mar. 7, 2006, 4 pp.

"Chapter 13—OLAP Services", SQL Server 7.0 Resource Guide, 2006 Microsoft Corporation, http://www.microsoft.com/technet/prodtechnol/sql/70/reskit/part9/sqc12.mspx, printed Mar. 6, 2006, 18 pp.

"Cognos 8 Business Intelligence Overview", Cognos Incorporated, http://www.cognos.com/products/cognos8businessintelligence/index.html, printed Jan. 11, 2006, 1 pp.

"CorVu Products", Seabrook, http://www.seabrook.ie/corvu.htm#corvurapidscorecard, printed Mar. 7, 2006, 3 pp.

"Epicor Vantage: Introducing the Next Generation Global Enterprise Resource Planning Software", Epicor Vantage, http://www.scala.com.cn/downloads/vantage/vantage_60_page.pdf, printed Jan. 12, 2006, 60 pp.

"Extend Business Scorecard Manager 2005", ProClarity, http://www.proclarity.com/products/clients_scorecardmanager.asp, printed Jan. 11, 2006, 2 pp.

"Microsoft Office Business Scorecard Manager 2005 Overview and Benefits", Microsoft Corporation, http://www.office.microsoft.com/en-us/assistance/HA012225141033.aspx, printed Jan. 11, 2006, 3 pp.

"MicroStrategy: Best in Business Intelligence", MicroStrategy Inc., http://www.microstrategy.com/Software/Products/User-Interfaces/Web, printed Jan. 11, 2006, 3 pp.

"OutlookSoft CPM: A Unified Corporate Performance Management Solution", OutlookSoft Corporation, http://www.outlooksoft.com/product.index.htm, printed Jan. 11, 2006, 2 pp.

"Scorecarding with Cognos® Metrics Manager", Cognos, http://www.cognos.com/pdfs/factsheets/fs_scorcarding_with_cognos_metrics_manager.pdf, printed Mar. 7, 2006, 4 pp.

Badii, Atta et al., "Information Management and Knowledge Integration for Enterprise Innovation", Logistics Information Management, vol. 16, No. 2, 2003, http://www.emeraldinsight.com/Insight/ViewContentServlet?Filename=Published/EmeraldFullTextArticle/Pdf/0880160205.pdf, pp. 145-155.

Bajwa, Deepinder S. et al., "An Empirical Assessment of the Adoption and Use of Collaboration Information Technologies in the U.S., Australia, and Hong Kong", http://dsslab.sims.monash.edu,au/dss2004/proceedings/pdf/07_Bajwa_Lewis_Pervan_Lai.pdf, printed Jan. 12, 2006, copyright 2004, pp. 60-69.

Bird, Steven et al., "Annotation Graphs as a Framework for Multidimensional Linguistic Data Analysis", http:///acl.ldc.upenn.educ/W/W99/W99-0301.pdf, printed Jan. 12, 2006, pp. 1-10.

Calame, Paul et al., "Cockpit: Decision Support Tool for Factory Operations and Supply Chain Management", Intel Technology Journal Q1, 2000 Intel Corporation, http://developer.intel.com/technology/itj/q12000/pdf.cockpit.pdf, pp. 1-13.

Elmanova, Natalia, "Implementing OLAP in Delphi Applications", http://www.only4gurus.net/miscellaneous/implementing_olap_in_delphi_a.doc, printed Mar. 6, 2006, 19 pp.

Ferguson, Mike, "Conquering CPM and Business Intelligence", Business Intelligence.com, ITNews265, http://www.businessintelligence.com/ex/asp.code.21/xe/article.htm, printed Jan. 11, 2006, 6 pp.

Lebow, David G. et al., "HyLighter: An Effective Interactive Annotation Innovation for Distance Education", http://wwwuwex.edu/disted/conference/Resource_library/proceedings/04_1344.pdf, printed Jan. 12, 2006, 5 pp.

Rother, Kristian et al., "Multidimensional Data Integration of Protein Annotations", Springer-Verlag GmbH, http://www.springerlink.com/(3riocx450rr2iv55x2txum55)/app/home/contribution.asp?referrer=parent&backto=issue,11,15;journal,827,2337;linkingpublicationresults, 1:105633,1, printed Jan. 12, 2006, 2 pp.

Sanders, Paul, "SQL Server 2005: Real-Time Business Intelligence Using Analysis Services", Microsoft Corporation, Apr. 1, 2005, http://www.microsoft.com/technet/prodtechnol/sql/2005/rtbissas.mspx, printed Jan. 11, 2006, 9 pp.

U.S. Appl. No. 11/039,714, filed Jan. 1, 2005 entitled "System and Method for Multi-Dimensional Average-Weighted Banding Status and Scoring".

U.S. Appl. No. 11/214,678, filed Aug. 30, 2005 entitled "Visual Designer for Multi-Dimensional Business Logic".

U.S. Appl. No. 11/280,548, filed Nov. 16, 2005 entitled "Score-Based Alerting in Business Logic".

U.S. Appl. No. 11/313,324, filed Dec. 21, 2005 entitled "Application Independent Rendering of Scorecard Metrics".

U.S. Appl. No. 11/313,327, filed Dec. 21, 2005 entitled "Repeated Inheritance of Heterogeneous Business Metrics".

U.S. Appl. No. 11/313,390, filed Dec. 21, 2005 entitled "Disconnected Authoring of Business Definitions".

U.S. Appl. No. 11/313,899, filed Dec. 21, 2005 entitled "Centralized Model for Coordinating Update of Multiple Reports".

U.S. Appl. No. 11/393,019, filed Mar. 30, 2006 entitled "Automated Generation of Dashboards for Scorecard Metrics and Subordinate Reporting".

U.S. Appl. No. 11/393,115, filed Mar. 30, 2006 entitled "Definition and Instantiation of Metric Based Business Logic Reports".

U.S. Appl. No. 11/393,335, filed Mar. 30, 2006 entitled "MultiDimensional Metrics-Based Annotation".

U.S. Appl. No. 11/408,450, filed Apr. 21, 2006 entitled "Grouping and Display of Logically Defined Reports".

U.S. Appl. No. 11/412,458, filed Apr. 27, 2006 entitled "Concerted Coordination of Multi-Dimensional Scorecards".

U.S. Appl. No. 11/412,499, filed Apr. 27, 2006 entitled "Automated Determination of Relevant Slice in Multidimensional Data Sources".

Zaidi, Omar et al., "Data Center Consolidation: Using Performance Metrics to Achieve Success", http://searchnetworking.techtarget.com/searchNetworking/Downloads/IV_INS_DataCenter_Consolidation_WP.pdf, printed Jan. 12, 2006, 10 pp.

U.S. Official Action mailed Dec. 24, 2008 in U.S. Appl. No. 11/624,171.

Kraynak, "Absolute Beginner's Guide to Microsoft Office Excel 2003", Que, Sep. 2003, 32 pp.

Acharya, Sharad, "Pattern Language for Data Driven Presentation Layer for Dynamic and Configurable Web Systems," Version: Conference Draft, Jul. 26, 2004, pp. 1-33, http://hillside.net/plop/2004/papers/sacharya0/PLoP2004_sacharya0_0.pdf.

"Data Driven Components," Java Developers Journal, SYS-CON Media, Inc. 2004, http://www2.sys-con.com/itsg/virtualcd/Java/archives/0405/hyrkas/index.html, 7 pp.

"Hyperion Intelligence Desktop, Plugin, and HTML Client Products," Hyperion™ Developer Network, http://dev.hyperion.com/resource_library/articles/intelligence_desktop_article.cfm, 7 pp.

"BusinessObjects Enterprise 6," An End-to-End Overview, White Paper., http://www.spain.businessobjects.com/global/pdf/products/queryanalysis/wp_e6_overview.pdf, 20 pp.

"Cognos 8 Business Intelligence—Dashboards," COGNOS® The Next Level of Performance, http://www.cognos.com/products/cognos8businessintelligence/dashboards.html, 2 pp.

"Microsoft Builds Business Intelligence Into Office Software," Microsoft PressPass—Information for Journalists, http://www.microsoft.com/presspass/press/2005/oct05/10-23BiLalunchPR.mspx, 4 pp.

"Hyperion System $_9$ BI+Enterprise Metrics," A Hyperion Data Sheet, Hyperion Solutions Corporation Worldwide Headquarters, Oct. 2006, http://www.hyperion.com/products/resource_library/product_collateral/EnterpriseMetrics.pdf, pp. 1-2.

"Products: PilotWorks," Products: PilotWorks—Scorecard, 2006 Pilot Software, pp. 1-3.

"Reveleus Business Analytics," Reveleus, an i-flex businedss, pp. 1-4.

Batista, Gustavo E.A.P.A.; Monard, Maria Carolina; "An Analysis of Four Missing Data Treatment Methods for Supervised Learning," University of Sao Paulo, Institute of Mathematics and Computer Science (ICMC), http://coblitz.codeen.org:3125/citeseer.ist.psu.edu/cache/papers/cs/27545/http:zSzzSzwww.icmc.usp.brzSz~gbatistazSzpdfszSzaai2003.pdf/batista03analysis.pdf, 12 pp.

"Crystal Xcelsius Workgroup." http://www.xcelsius.com/Products/Enterprise_feastures.html, 3 pp.

"Reporting and Dashboards with Cognos 8 Business Intelligence," Cognos, The Next Level of Intelligence, http://www.cognos.com/pdfs/whitepapers/wp_reporting_and_dashboards_with_c8bi.pdf, pp. 1-16.

"BusinessObjects Plan Dashboarding XI for Retail," BusinessObjects, http://www.businessobjects.com/pdf/products/planning/plan_dashboarding_rt.pdf, 2 pp.

"SAS® Risk Intelligence Offerings, Risk Reporting; Data Integration; Internal Risk Ratings; Credit Risk; Market Risk; Operational Risk", http://www.sas.com/industry/fsi/risk/brochure2.pdf, 12 pp.

Tenhunen, Jarkko; Ukko, Juhani; Markus, Tapio; Rantanen, Hannu; "Applying Balanced Scorecard Principles On the SAKE-System: Case Telekolmio Oy," Lappeenranta University of Technology (Department of Industrial Engineering and Management); Telekolmio Oy (Finland). http://www.lut.fi/tuta/lahti/sake/IWPM2003a.pdf, 11 pp.

Kleijnen, Jack; Smits, Martin T.; "Performance Metrics in Supply Chain Management," Tilburg University, The Netherlands, Department of Information Systems and Management. http://center.kub.nl/staff/kleijnen/jors-proofs.pdf, 8 pp.

Martinsons, Maris; Davison, Robert; Tse, Dennis; "The Balanced Scorecard: A Foundation for the Strategic Management of Information Systems," University of Hong Kong, Sep. 28, 1998. http://teaching.fec.anu.edu.au/BUSN7040/Articles/Martinsons%20et%20al%201999%20DSS%20the%20balanced%20scorecard.pdf, 18 pp.

U.S. Office Action mailed Sep. 5, 2008 cited in U.S. Appl. No. 11/280,548.

U.S. Office Action dated Nov. 24, 2008 cited in U.S. Appl. No. 11/214,678.

U.S. Official Action mailed May 28, 2009 in U.S. Appl. No. 11/280,548.

U.S. Official Action mailed Jun. 3, 2009 in U.S. Appl. No. 11/393,335.

U.S. Official Action mailed May 28, 2009 in U.S. Appl. No. 11/214,678.

U.S. Official Action mailed Jun. 19, 2009 in U.S. Appl. No. 11/408,450.

Kraynak, "Absolute Beginner's Guide to Microsoft Office Excel 2003", Que, Sep. 2003, 32 pp.

John Wiley et al., "Power Point All-in-One Desk Reference for Dummies," Jan. 10, 2007.

U.S. Official Action mailed Oct. 21, 2009 in U.S. Appl. No. 11/280,548.

U.S. Official Action mailed Dec. 8, 2009 in U.S. Appl. No. 11/393,335.

U.S. Official Action mailed Dec. 14, 2009 in U.S. Appl. No. 11/393,019.

U.S. Official Action mailed Dec. 28, 2009 in U.S. Appl. No. 11/624,171.

U.S. Official Action mailed Jan. 15, 2010 in U.S. Appl. No. 11/408,450.

U.S. Official Action mailed Aug. 6, 2009 in U.S. Appl. No. 11/668,530.

U.S. Official Action mailed Aug. 19, 2009 in U.S. Appl. No. 11/393,115.

U.S. Official Action mailed Sep. 2, 2009 in U.S. Appl. No. 11/624,171.

U.S. Official Action mailed Sep. 30, 2009 in U.S. Appl. No. 11/214,678.

IndicatorBarometer; retrieved from <http://www.aiqsystems.com/docs/ref_ 7.pdf>, archived Oct. 15, 2004.

* cited by examiner

MULTIDIMENSIONAL SCORECARD HEADER DEFINITION

BACKGROUND

Key Performance Indicators, also known as KPI or Key Success Indicators (KSI), help an organization define and measure progress toward organizational goals. Once an organization has analyzed its mission, identified all its stakeholders, and defined its goals, it needs a way to measure progress toward those goals. Key Performance Indicators are used to provide those measurements.

Scorecards are used to provide detailed and summary analysis of KPIs and aggregated KPIs such as KPI groups, objectives, and the like. Scorecard calculations are typically specific to a defined hierarchy of the above mentioned elements, selected targets, and status indicator schemes. Business logic applications that generate, author, and analyze scorecards are typically enterprise applications with multiple users (subscribers), designers, and administrators. It is not uncommon, for organizations to provide their raw performance data to a third party and receive scorecard representations, analysis results, and similar reports.

Scorecard applications enable users to monitor business processes in real-time, providing a visual display of business process status. Users can receive alerts and notifications to facilitate continuous improvement of business processes. Scorecard views are utilized td track key performance indicators against selected goals, manage responses to anomalous business situations, gain a more in-depth understanding of business processes, optimizing them for increased efficiency, visualize those areas that are critical for success, using dashboards, and perform multidimensional analysis, based on feedback.

It is with respect to these and other considerations that the present invention has been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to generating and modifying header components for effective presentation of multidimensional scorecard views. Users are provided options to select individual or sets of members, or provide queries that select sets of metrics for the scorecard view. Layered header components may be defined in an editing user interface enabling the user to view categorized metrics. Additional columns providing attribute information associated with the metrics may also be inserted in selected places within the scorecard matrix.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

As briefly described above, header components may be defined and utilized in multiple layers to categorize metrics and enhance presentation of multidimensional scorecards. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

Figure 1:
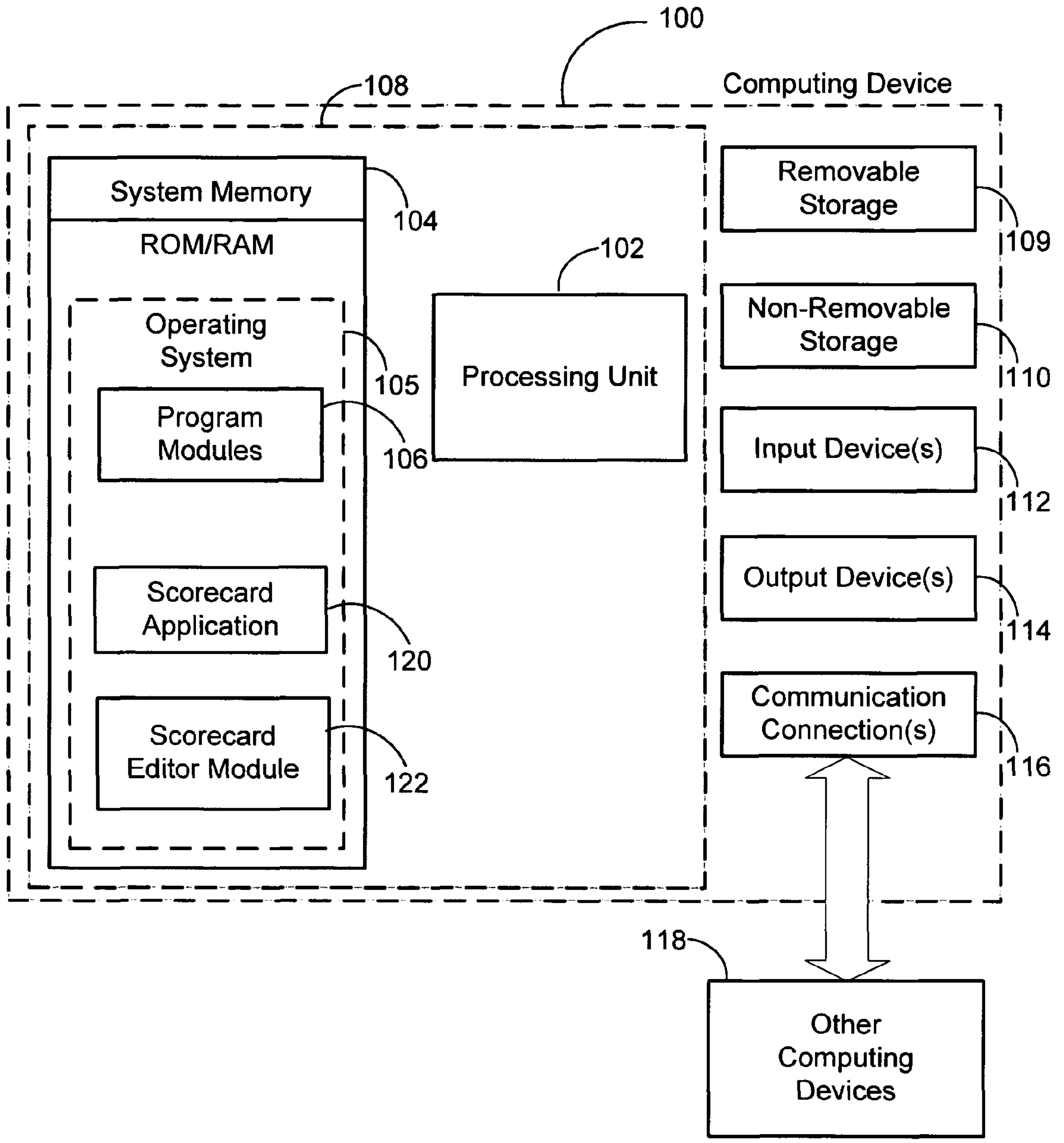
FIG. 1 is a block diagram of an example computing operating environment.

Referring now to the drawings, aspects and an exemplary operating environment will be described. FIG. 1 and the following discussion are intended to provide a brief, general description of a suitable computing environment in which the invention may be implemented. While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

With reference to FIG. 1, one example system for implementing the embodiments includes a computing device, such as computing device 100. In a basic configuration, the computing device 100 typically includes at least one processing unit 102 and system memory 104. Depending on the exact configuration and type of computing device, the system memory 104 may be volatile (such as RAM), non-volatile (such as ROM, flash memory, etc.) or some combination of the two. System memory 104 typically includes an operating system 105 suitable for controlling the operation of a networked personal computer, such as the WINDOWS® operating systems from MICROSOFT CORPORATION of Redmond, Wash. The system memory 104 may also include one or more software applications such as program modules 106, scorecard application 120 and scorecard editor module 122. Scorecard application 120 manages business evaluation methods, computes KPIs, and provides scorecard data to reporting applications. In some embodiments, scorecard application 120 may itself generate reports based on metric data.

Scorecard editor module 122 provides a user interface (UI) for selection and definition of header components, additional columns, and scorecard matrix arrangement based on the elements. Once the selections are complete, the information can be consumed by the scorecard application 120 or reporting application(s) for computation, report generation, and similar purposes. Scorecard editor module 122 may be an integrated part of scorecard application 120 or a separate application. Scorecard application 120, scorecard editor module 122, and the reporting application(s) may communicate between themselves and with other applications running on computing device 100 or on other devices. Furthermore, either one of scorecard application 120 and scorecard editor module 122 may be executed in an operating system other than operating system 105. This basic configuration is illustrated in FIG. 1 by those components within dashed line 108.

The computing device 100 may have additional features or functionality. For example, the computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well known in the art and need not be discussed at length here.

The computing device 100 may also contain communication connections 116 that allow the device to communicate with other computing devices 118, such as over a network in a distributed computing environment, for example, an intranet or the Internet. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
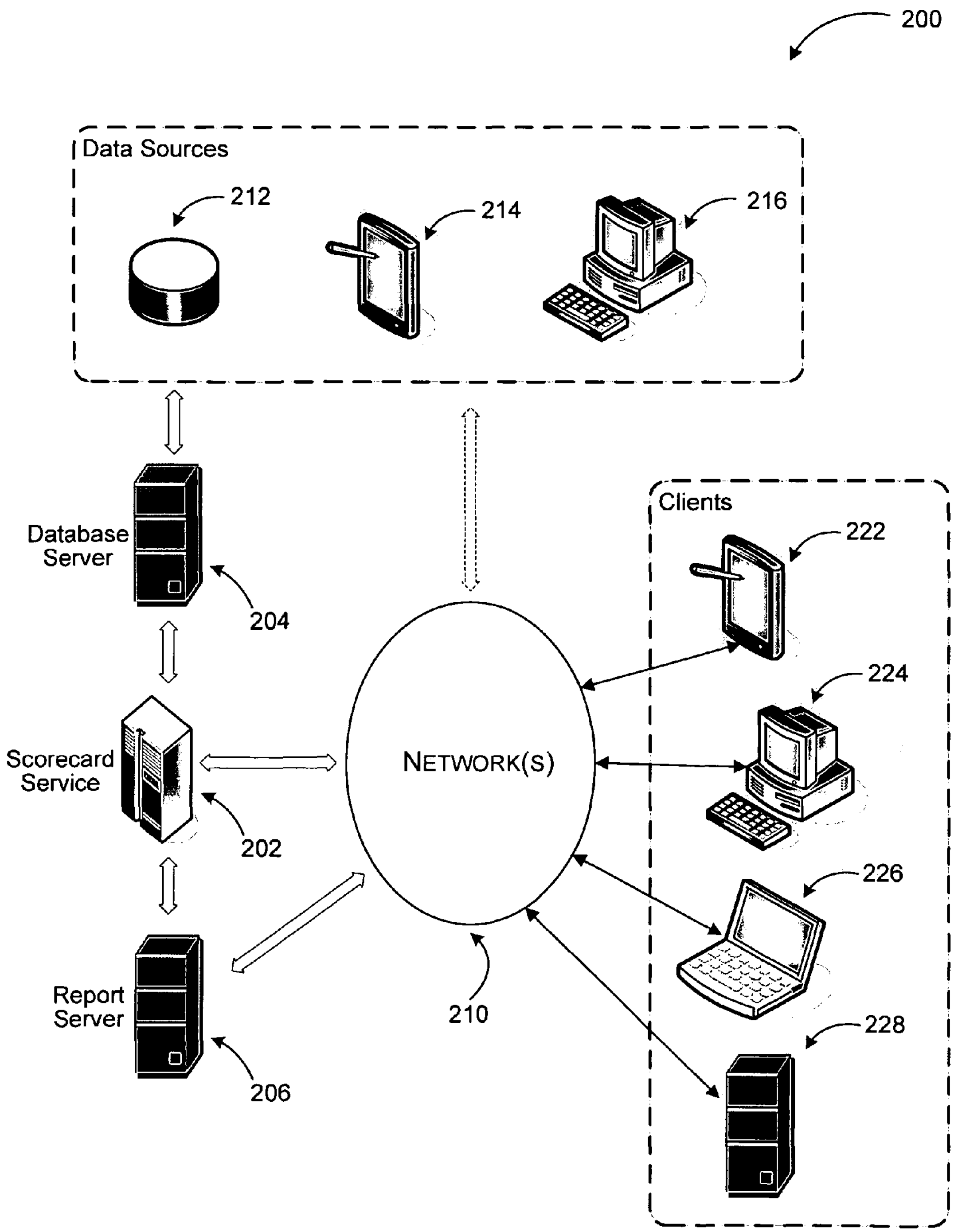
FIG. 2 illustrates a system where example embodiments may be implemented.

Referring to FIG. 2, a system where example embodiments may be implemented, is illustrated. System 200 may comprise any topology of servers, clients, Internet service providers, and communication media. Also, system 200 may have a static or dynamic topology. The term "client" may refer to a client application or a client device employed by a user to perform business logic operations. Scorecard service 202, database server 204, and report server 206 may also be one or more programs or a server machine executing programs associated with the server tasks. Both clients and application servers may be embodied as single device (or program) or a number of devices (programs). Similarly, data sources may include one or more data stores, input devices, and the like.

A business logic application may be run centrally on scorecard service 202 or in a distributed manner over several servers and/or client devices. Scorecard service 202 may include implementation of a number of information systems such as performance measures, business scorecards, and exception reporting. A number of organization-specific applications including, but not limited to, financial reporting, analysis, marketing analysis, customer service, and manufacturing planning applications may also be configured, deployed, and shared in system 200. In addition, the business logic application may also be run in one or more client devices and information exchanged over network(s) 210.

Data sources 212, 214, and 216 are examples of a number of data sources that may provide input to scorecard service 202 through database server 204. Additional data sources may include SQL servers, databases, non multi-dimensional data sources such as text files or EXCEL® sheets, multi-dimensional data source such as data cubes, and the like. Database server 204 may manage the data sources, optimize queries, and the like.

Users may interact with scorecard service 202 running the business logic application from client devices 222, 224, and 226 over network(s) 210. In one embodiment, additional applications that consume scorecard-based data may reside on scorecard service 202 or client devices 222, 224, and 226. Examples of such applications and their relation to the scorecard application are provided below in conjunction with FIG. 3.

According to some embodiments, users may be provided a UI to select and define elements, organization and/or categorization of elements in form of header components or row components, as well as to insert additional columns for attribute information associated with the elements. Organization and categorization of elements within the scorecard matrix enhances a computational and visual effectiveness of the scorecard enabling users to monitor business performances more efficiently.

Report server 206 may include reporting applications, such as charting applications, alerting applications, analysis applications, and the like. These applications may receive scorecard data from scorecard service 202 and provide reports directly or through scorecard service 202 to clients.

Network(s) 210 may include a secure network such as an enterprise network, or an unsecure network such as a wireless open network. Network(s) 210 provide communication between the nodes described above. By way of example, and not limitation, network(s) 210 may include wired media such as a wired network or direct-wired connection, and wireless media such as acoustic, RF, infrared and other wireless media.

Many other configurations of computing devices, applications, data sources, data distribution and analysis systems may be employed to implement a business logic application automatically generating dashboards with scorecard metrics and subordinate reporting.

Figure 3:
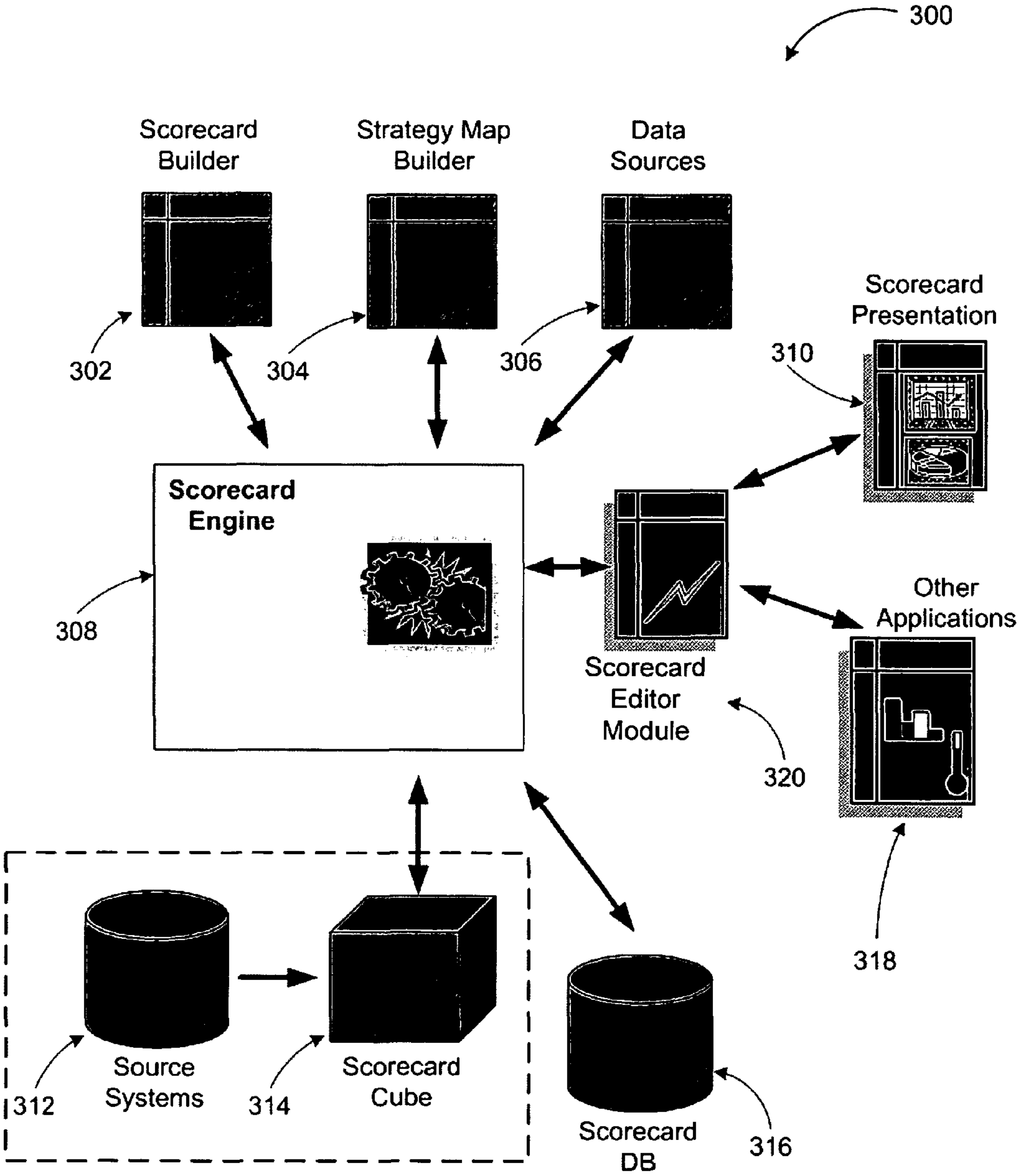
FIG. 3 illustrates an example scorecard architecture according to embodiments.

Now referring to FIG. 3, example scorecard architecture 300 is illustrated. Scorecard architecture 300 may comprise any topology of processing systems, storage systems, source systems, and configuration systems. Scorecard architecture 300 may also have a static or dynamic topology.

Scorecards are a simple method of evaluating organizational performance. The performance measures may vary from financial data such as sales growth to service information such as customer complaints. In a non-business environment, student performances and teacher assessments may be another example of performance measures that can employ scorecards for evaluating organizational performance. In the exemplary scorecard architecture 300, a core of the system is scorecard engine 308. Scorecard engine 308 may be an application that is arranged to evaluate performance metrics. Scorecard engine 308 may be loaded into a server, executed over a distributed network, executed in a client device, and the like.

In addition to performing scorecard calculation, scorecard engine may also provide report parameters associated with a scorecard to other applications 318. The report parameters may be determined based on a subscriber request or a user interface configuration. The user interface configuration may include a subscriber identity or a subscriber permission attribute. The report parameter may include a scorecard identifier, a scorecard view identifier, a row identifier, a column identifier, a page filter, a performance measure group identifier, or a performance measure identifier. The performance measure may be a KPI, a KPI group, or an objective. The page filter determines a period and an organizational unit for application of the scorecard calculations.

Data for evaluating various measures may be provided by a data source. The data source may include source systems 312, which provide data to a scorecard cube 314. Source systems 312 may include multi-dimensional databases such as an Online Analytical Processing (OLAP) database, other databases, individual files, and the like, that provide raw data for generation of scorecards. Scorecard cube 314 is a multi-dimensional database for storing data to be used in determining Key Performance Indicators (KPIs) as well as generated scorecards themselves. As discussed above, the multi-dimensional nature of scorecard cube 314 enables storage, use, and presentation of data over multiple dimensions such as compound performance indicators for different geographic areas, organizational groups, or even for different time intervals. Scorecard cube 314 has a bi-directional interaction with scorecard engine 308 providing and receiving raw data as well as generated scorecards.

Scorecard database 316 is arranged to operate in a similar manner to scorecard cube 314. In one embodiment, scorecard database 316 may be an external database providing redundant back-up database service.

Scorecard builder 302 may be a separate application, a part of the performance evaluation application, and the like. Scorecard builder 302 is employed to configure various parameters of scorecard engine 308 such as scorecard elements, default values for actuals, targets, and the like. Scorecard builder 302 may include a user interface such as a web service, a Graphical User Interface (GUI), and the like:

Strategy map builder 304 is employed for a later stage in scorecard generation process. As explained below, scores for KPIs and parent nodes such as Objective and Perspective may be presented to a user in form of a strategy map. Strategy map builder 304 may include a user interface for selecting graphical formats, indicator elements, and other graphical parameters of the presentation.

Data Sources 306 may be another source for providing raw data to scorecard engine 308. Data sources may be comprised of a mix of several multi-dimensional and relational databases or other Open Database Connectivity (ODBC)-accessible data source systems (e.g. Excel, text files, etc.). Data sources 306 may also define KPI mappings and other associated data.

Scorecard architecture 300 may include scorecard presentation 310. This may be an application to deploy scorecards, customize views, coordinate distribution of scorecard data, and process web-specific applications associated with the performance evaluation process. For example, scorecard presentation 310 may include a web-based printing system, an email distribution system, and the like. A user interface for scorecard presentation 310 may also include an overview of available scorecards for a subscriber to select from. Scorecard presentation 310 may further include a matrix or a list presentation of the scorecard data. The scorecard presentation and one or more zones for other applications may be displayed in an integrated manner.

Scorecard editor module 320 is configured to interact with scorecard engine 308, scorecard presentation 310, other applications 318, and manage through an editor UI categorization and organization of scorecard elements. In a comprehensive business application, creating a multidimensional scorecard may include combining a scorecard hierarchy of KPIs from multiple data sources, generating a grid of data based on the actuals and targets of a KPI along with dimensional column header information used to break out the data (e.g. by month, by product, by competitor, etc.). Furthermore, metadata information about the KPI itself (e.g. KPI owner, last refreshed date, name of database admin, etc.) may also be included in the grid in form of additional columns.

Scorecard editor module enables the user through graphical and textual tools to select, define, and modify an order and categorization of the elements such as header components, row components, and the like. Details of such editing tools and processes are provided below in conjunction with FIGS. 5 through 10.

Other applications 318 may include any application that receives data associated with a report parameter and consumes the data to provide a report, perform analysis, provide alerts, perform further calculations, and the like. The data associated with the report parameter includes content data and metadata. Other applications may be selected based on the report parameter, a subscriber request, or a user interface configuration. The user interface configuration may include a subscriber identity or a subscriber permission attribute. Other applications 318 may include a graphical representation application, a database application, a data analysis application, a communications application, an alerting application, or a word processing application.

Figure 4:
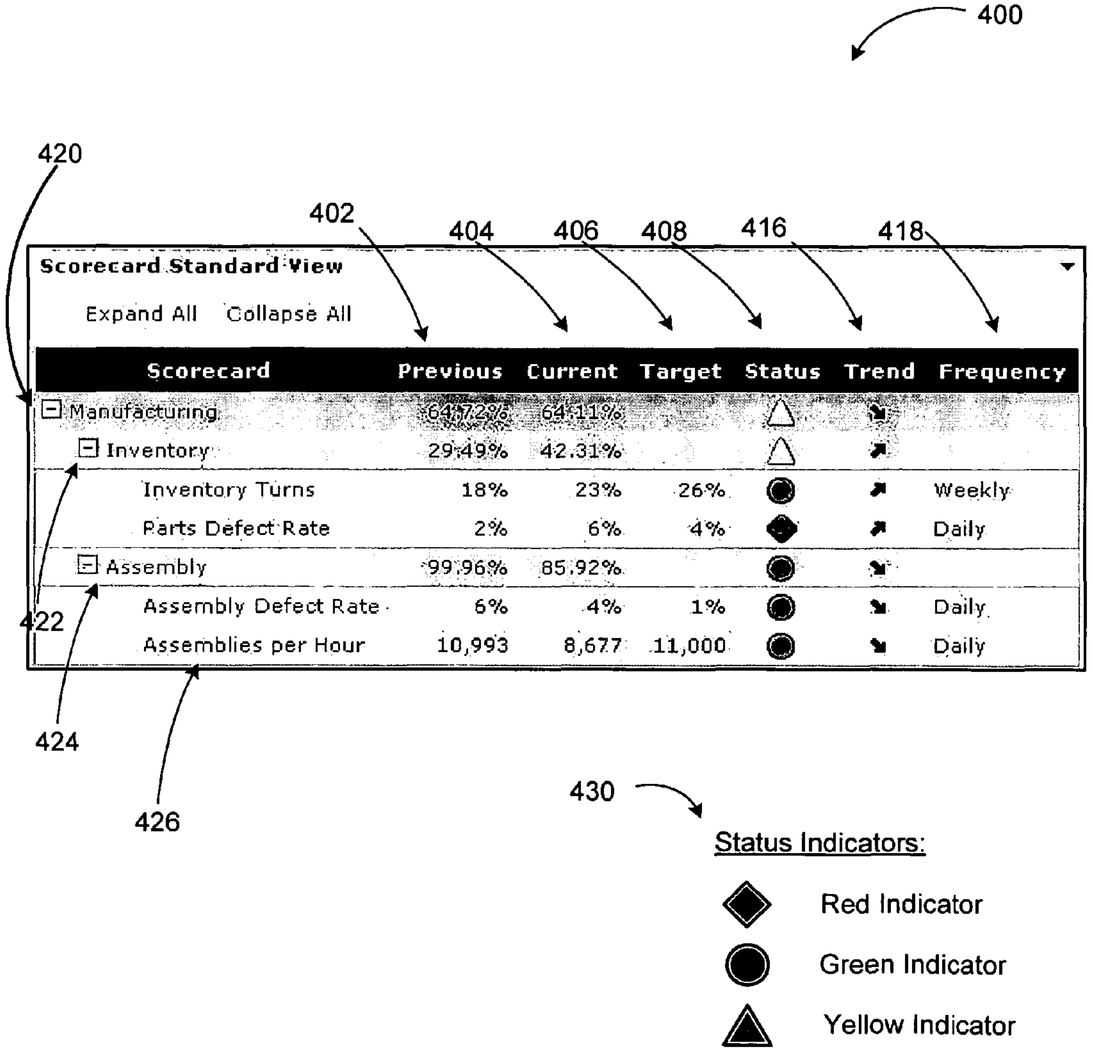
FIG. 4 illustrates a screenshot of an example scorecard.

FIG. 4 illustrates a screenshot of an example scorecard. As explained before, Key Performance Indicators (KPIs) are specific indicators of organizational performance that measure a current state in relation to meeting the targeted objectives. Decision makers may utilize these indicators to manage the organization more effectively.

When creating a KPI, the KPI definition may be used across several scorecards. This is useful when different scorecard managers might have a shared KPI in common. The shared use of KPI definition may ensure a standard definition is used for that KPI. Despite the shared definition, each individual scorecard may utilize a different data source and data mappings for the actual KPI.

Each KPI may include a number of attributes. Some of these attributes include frequency of data, unit of measure, trend type, weight, and other attributes. The frequency of data identifies how often the data is updated in the source database (cube). The frequency of data may include: Daily, Weekly, Monthly, Quarterly, and Annually.

The unit of measure provides an interpretation for the KPI. Some of the units of measure are: Integer, Decimal, Percent, Days, and Currency. These examples are not exhaustive, and other elements may be added without departing from the scope of the invention.

A trend type may be set according to whether an increasing trend is desirable or not. For example, increasing profit is a desirable trend, while increasing defect rates is not. The trend type may be used in determining the KPI status to display and in setting and interpreting the KPI banding boundary values. The trend arrows displayed in scorecard 400 indicate how the numbers are moving this period compared to last. If in this period the number is greater than last period, the trend is up regardless of the trend type. Possible trend types may include: Increasing Is Better, Decreasing Is Better, and On-Target Is Better.

Weight is a positive integer used to qualify the relative value of a KPI in relation to other KPIs. It is used to calculate the aggregated scorecard value. For example, if an Objective in a scorecard has two KPIs, the first KPI has a weight of 1, and the second has a weight of 3 the second KPI is essentially three times more important than the first, and this weighted relationship is part of the calculation when the KPIs' values are rolled up to derive the values of their parent Objective.

Other attributes may contain pointers to custom attributes that may be created for documentation purposes or used for various other aspects of the scorecard system such as creating different views in different graphical representations of the finished scorecard. Custom attributes may be created for any scorecard element and may be extended or customized by application developers or users for use in their own applications. They may be any of a number of types including text, numbers, percentages, dates, and hyperlinks.

One of the benefits of defining a scorecard is the ability to easily quantify and visualize performance in meeting organizational strategy. By providing a status at an overall scorecard level, and for each perspective, each objective or each KPI rollup, one may quickly identify where one might be off target. By utilizing the hierarchical scorecard definition along with KPI weightings, a status value is calculated at each level of the scorecard.

First column of scorecard 400 shows example elements perspective 420 "Manufacturing" with objectives 422 and 424 "Inventory" and "Assembly" (respectively) reporting to it. Second column 402 in scorecard 400 shows results for each measure from a previous measurement period. Third column 404 shows results for the same measures for the current measurement period. In one embodiment, the measurement period may include a month, a quarter, a tax year, a calendar year, and the like.

Fourth column 406 includes target values for specified KPIs on scorecard 400. Target values may be retrieved from a database, entered by a user, and the like. Column 408 of scorecard 400 shows status indicators.

Status indicators 430 convey the state of the KPI. An indicator may have a predetermined number of levels. A traffic light is one of the most commonly used indicators. It represents a KPI with three-levels of results—Good, Neutral, and Bad. Traffic light indicators may be colored red, yellow, or green. In addition, each colored indicator may have its own unique shape. A KPI may have one stoplight indicator visible at any given time. Indicators with more than three levels may appear as a bar divided into sections, or bands. Column 416 includes trend type arrows as explained above under KPI attributes. Column 418 shows another KPI attribute, frequency.

According to one scenario, a user may select a scorecard in his/her workspace. The user may browse through the scorecard details on a details screen and then navigate to a contents screen, where a tree view of the scorecard may be presented, with Objectives and KPIs. The user may activate a scorecard editor UI and edit scorecard metadata, updating the members listed under the reader and editor roles. The user may also create a new Objective to be listed at the top level of the scorecard. Under each objective there may be multiple KPIs from the scorecard server or from the workspace. The KPIs may come from the same or from different data sources. The user may also configure the weighting of different KPIs and Objectives, which may initially be defaulted to a predetermined value. The user may then add business rules to one or more KPIs, such that their contribution to their corresponding Objective (roll-up), and set indicators and alerts based on the KPIs or Objectives.

Figure 5:
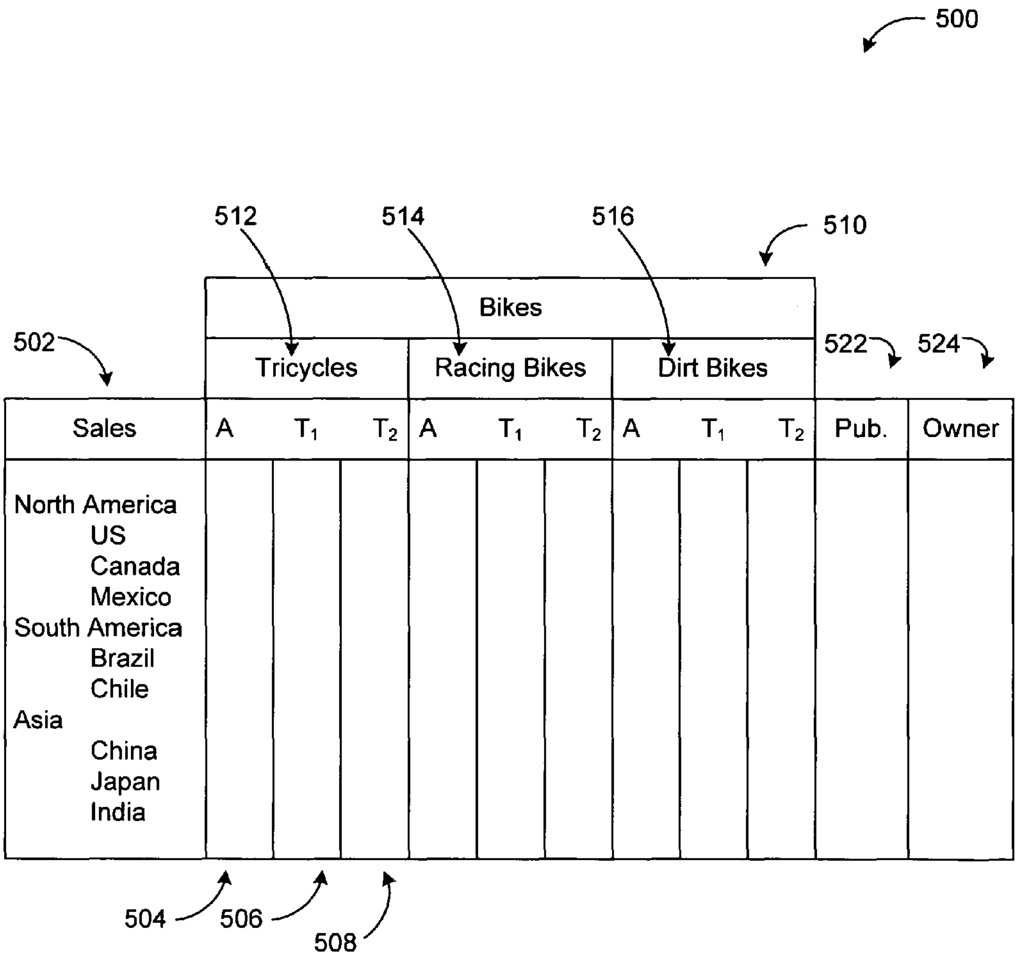
FIG. 5 illustrates an example scorecard with two layers of header components according to embodiments.

FIG. 5 illustrates an example scorecard with two layers of header components according to embodiments. Scorecard 500 is configured to provide "Sales" information for different geographies and for different product categories of bicycles.

Scorecard 500 shows one method of effectively presenting the sales actuals and targets for the different categories described above. According to one embodiment, header components may be used to categorize the scorecard elements and present the data in the grouped fashion to a user. The general product identifier "Bikes" (510) informs the user about the subject of the scorecard view. Under the main header "Bikes" three subcategories, tricycles (512), racing bikes (514), and dirt bikes (516) are listed. For each header, one column of actuals data (504) and two columns of target data (506 and 508) are shown.

The rows of the metrics column "Sales" (502) present a geographic breakdown of the sales organization by region and reporting countries. Two so-called "flat columns" 522 and 524 are also shown. These columns are typically used to provide attribute information such as publication date or owner for each KPI.

According to some embodiments, a scorecard building process may include an editor UI that presents a user with options to select the metrics for the scorecard. The selection may be done using a checkbox style listing of all available metrics, a drop-down menu listing name sets (e.g. top ten countries, lowest four countries, all North American countries, etc.), or using a query. The query may be completely specified by the user or selected from a number of preset queries (all countries above threshold, all countries below threshold, etc.). The user may also be prompted to simply enter any metrics they desire to include in the scorecard.

Next, the header component options may be provided based on the selected metrics. For example, the three bike categories may be presented and the user prompted to select. If some header components are not applicable based on the metrics selection (e.g. the only country that sells dirt bikes is not selected by the user), those may be dropped from the list of available header components. Moreover, a depth of layers may also be modified based on user selection. According to another embodiment, the user may define additional headers or remove existing ones.

Once the headers and metrics are selected a validation operation may be performed to ensure data for the scorecard matrix can be retrieved without degenerate queries. The validation may also be applied to the selection of the metrics, if the query method of selecting the metrics is employed.

Multiple headers may be used for each scorecard allowing a user to select different headers for different scorecard views. In a further embodiment, the scorecard application may detect a localization parameter from a browser employed by the user, a geography of the selected metrics, source data, and the like. The localization parameter may be used to customize the scorecard presentation based on local information such as language, time, data format (currency, decimals, etc.)

Upon successful validation and localization, the scorecard matrix may be generated based on the selections with the data categorized by the headers and the row components (metrics in this case). The flat columns may be added using the editor UI following the generation of the scorecard matrix or during the generation of the scorecard matrix. Information for the flat columns may be received from the metadata associated with the scorecard elements. According to some embodiments, flat column data that comes from different data sources and is differently designated (e.g. owner or responsible person) may be detected as being similar and combined into a single flat column. Moreover, the placement of the flat columns may also be determined based on user selection in the editor UI.

When the categorization and generation of the matrix is complete with the flat columns, the matrix may be presented in a scorecard view. A preview mode may provide a glimpse of what the scorecard view may look like as different elements are being edited by the UI.

User selections such as selected headers, row components, and the like, may be preserved for subsequent use in the same or in another scorecard. While geography and products are used as example in scorecard 500 with one actual and two targets for each metric, embodiments are not so limited. Any type of scoring may be used with a number of actuals and target values.

Figure 6:
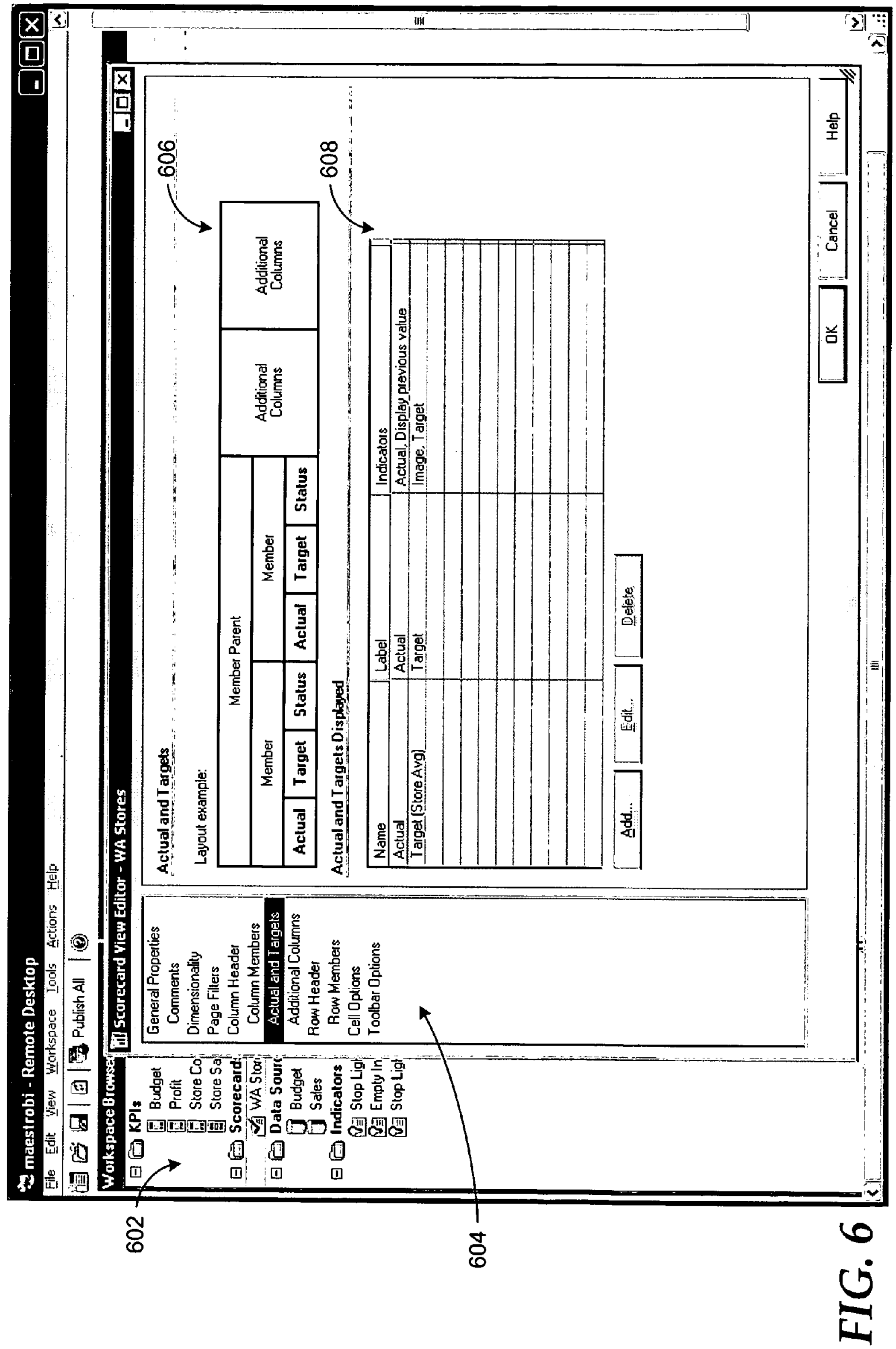
FIG. 6 illustrates a screenshot of a scorecard editor user interface (UI) for defining header components in a scorecard.

FIG. 6 illustrates a screenshot of a scorecard editor user interface (UI) for defining header components in a scorecard. A scorecard editor UI may be an integrated part of a scorecard application or a separate application. It may be presented in any way known in the art. The example scorecard editor UI is selected from a tree-style listing of available KPIs, scorecards, data sources, and indicators in a workspace browser 602. Upon selection of one of the items (e.g. WA stores) in the workspace browser portion 602, information associated with the selected item is presented in a new display frame, a task pane, or an integrated form of the UI. The editor UI may provide information such as details of the selected item, actuals and targets included in the selected KPI or scorecard, configured views of the KPI or scorecard, and report views associated with the selected KPI or scorecard.

Options to enter or modify scorecard items (604) such as page filters, dimensionality, toolbar options, and the like, are provided for selection along with editing options for headers and row components. In the example editor UI, actuals and targets are selected under header components. Accordingly, a layout example 606 is provided along with available actual and target data. According to some embodiments, the user may select the appropriate cells in the example layout and define the header and subheader components. Then selected actuals and targets may be associated with the headers and subheaders.

Definition and placement of additional columns (flat columns) is discussed below in conjunction with FIG. 9.

The screenshot of scorecard editor UI is an example presentation of a scorecard editor with header component definition capability. Embodiments are not limited to the example scorecard layouts, components, views, and user interface controls for managing those described above. Using headers in multidimensional scorecards may be provided in many other ways using the principles described herein.

Figure 7:
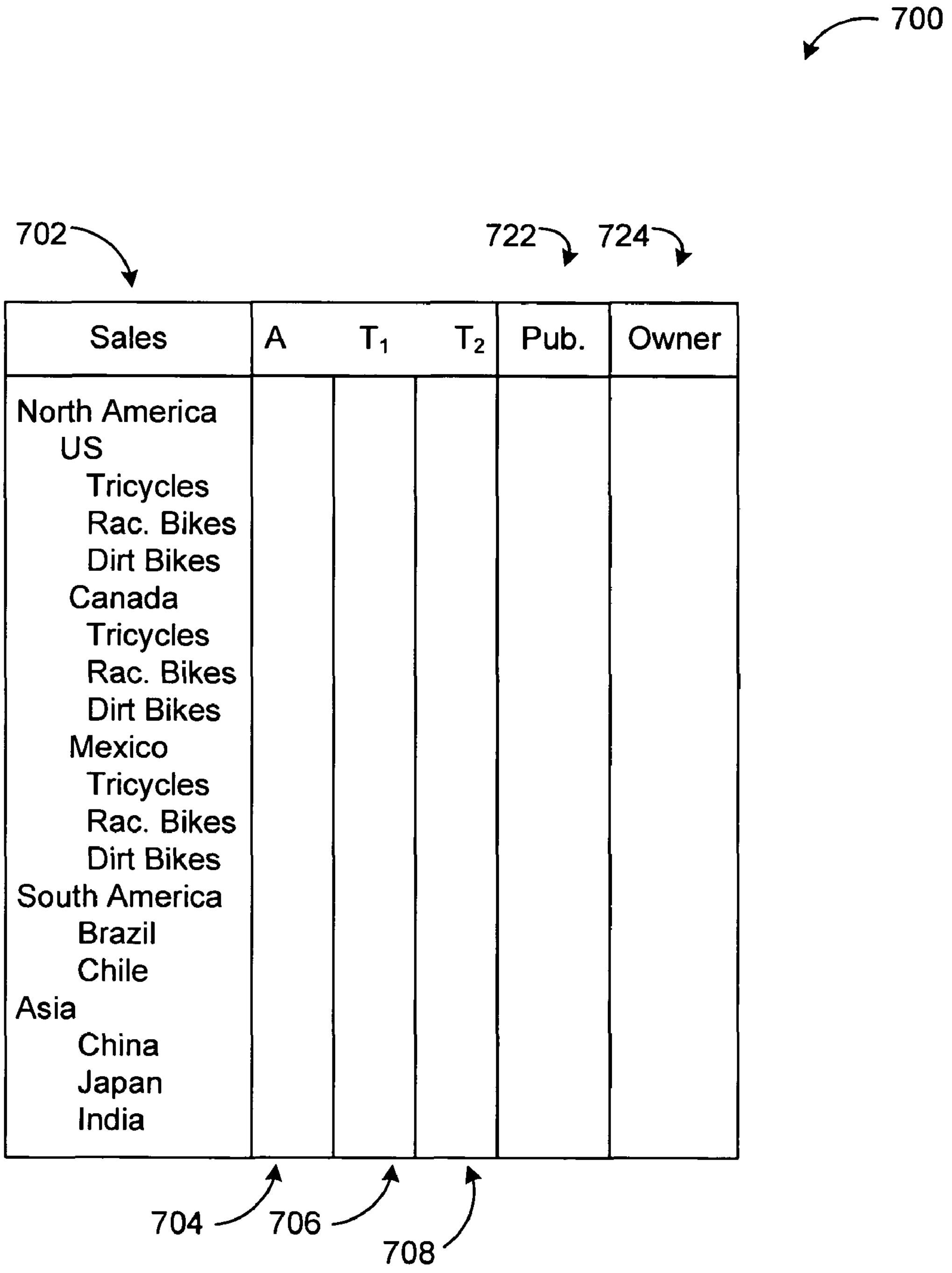
FIG. 7 illustrates a modified version of the scorecard of FIG. 5 with the header components integrated into the rows.

FIG. 7 illustrates a modified version of the scorecard of FIG. 5 with the header components integrated into the rows. Scorecard 700 includes "Sales" geographies hierarchically listed in column 702 followed by a column of actuals (704) and two columns of targets (706, 708). Similar to FIG. 5, a publication date column 722 and owner column 724 are also included. This feature enables arbitrary data to be combined in the scorecard based on the metadata definition of the KPI combined with the scorecard context. For example, two metrics "Revenue" and "Costs" may be shown with a multidimensional header with columns for actuals and targets for January, February and March. Additional columns can be added to bring in data unrelated to the quantitative sales information via an arbitrary query, such as a query to a human resources database to bring back the phone number of the owner of a metric to be shown in the additional column.

Differently from FIG. 5, the product categories are listed under each metric as row components instead of a layered header component structure. Thus, the number of columns is reduced while the number of rows is increased. For many categories such as product, geography, organizational structure, and the like, the header components and the row components may be interchangeable.

A scorecard editor UI according to embodiments may provide a user the option to switch between header components and row components enabling the user to select a combination that fits best their needs. However, certain combinations may result in a scorecard matrix with degenerate queries for data retrieval. Therefore, a validation operation may be performed as described previously to ensure the combination of row components and header components make sense.

Figure 8:
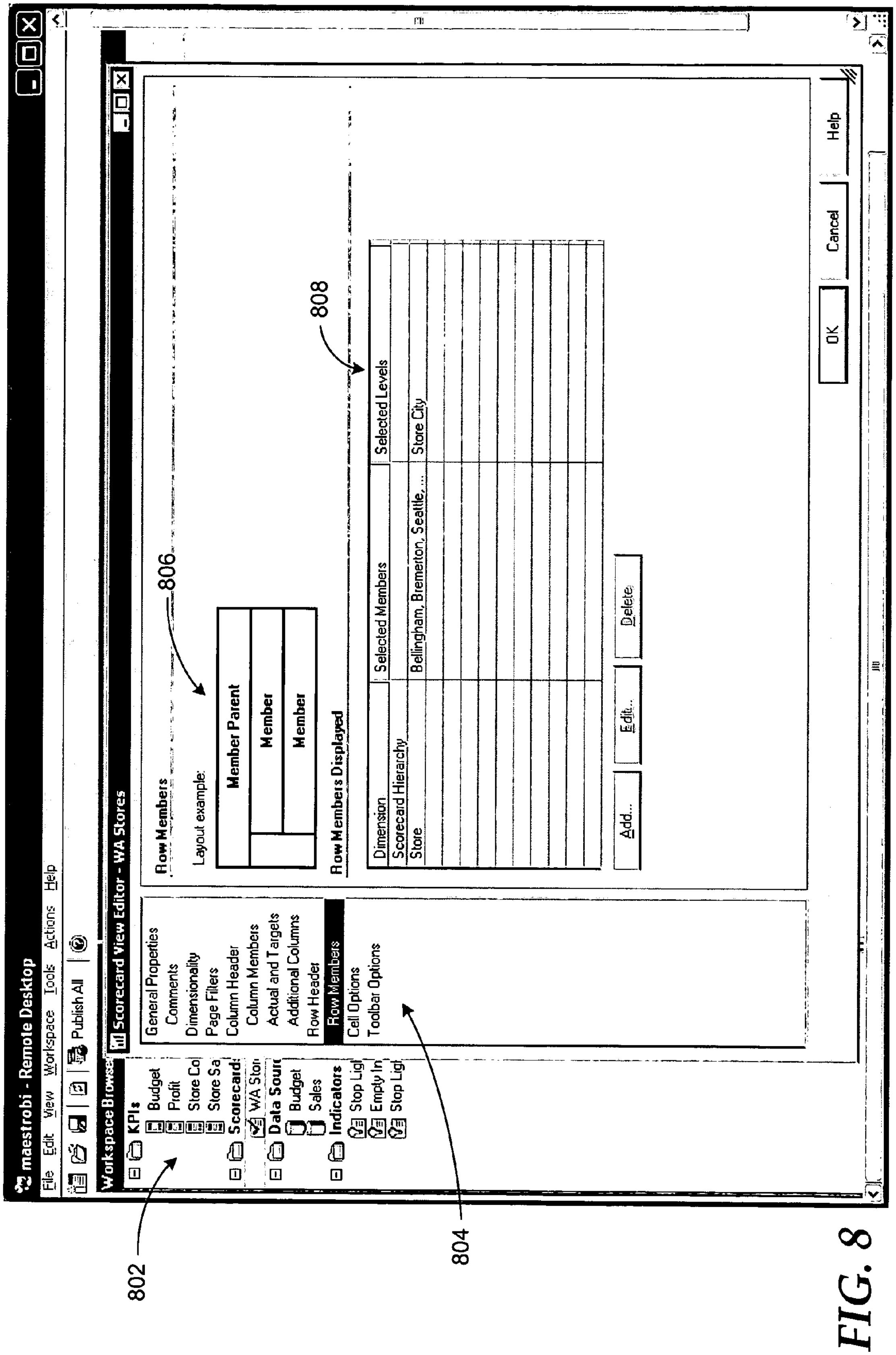
FIG. 8 illustrates a screenshot of a scorecard editor UI for defining row members in a scorecard.

FIG. 8 illustrates a screenshot of a scorecard editor UI for defining row members in a scorecard. As described above, some categories may be presented as row components inserted between hierarchically structured metrics of the scorecard. The screenshot of FIG. 8 shows an example editor for a scorecard with row components. Similar to FIG. 6, workspace browser portion 802 of the UI includes a listing of KPIs and scorecards available to a subscriber in the scorecard application. The KPIs and scorecards (as well as other elements such as Objectives) may be presented in a listing tree format, a simple listing format, and any other format known in the art. Workspace browser portion 802 may also include a listing of associated data sources and indicators used in the scorecard views.

Example layout 806 shows a layout of rows as opposed to a header structure. Row members 808 show a listing of available row members, in this case stores. If product categories such as those shown in FIG. 7 were used in this scorecard, the editor screen would list the product categories under available row components. The user may then select those categories he/she would like to see listed under each metric. Once row components are selected, their properties may also be modified or set by the user.

Figure 9:
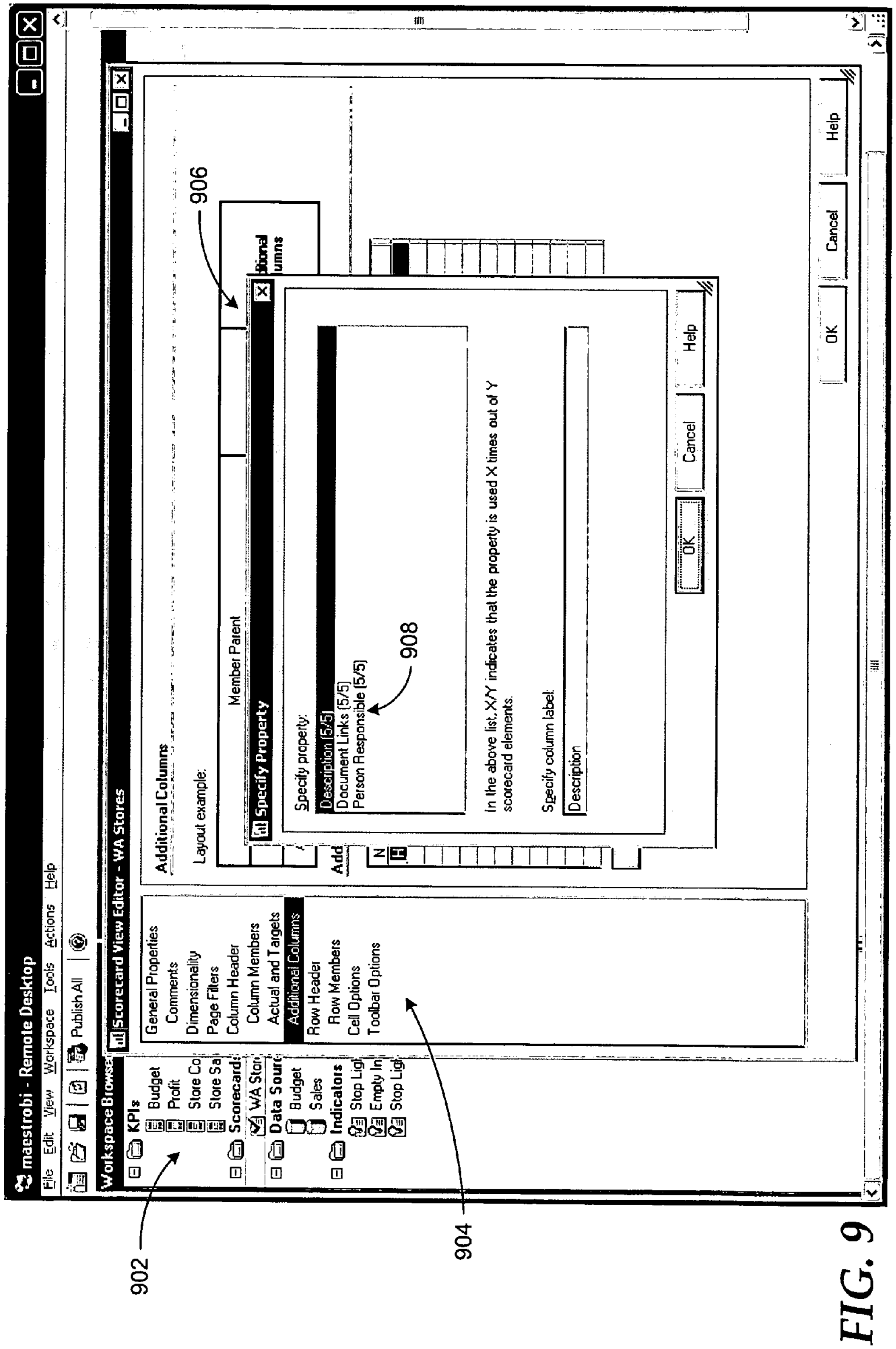
FIG. 9 illustrates a screenshot of a scorecard editor UI for defining additional columns in a scorecard.

FIG. 9 illustrates a screenshot of a scorecard editor UI for defining additional columns in a scorecard. The scorecard editor UI shown in FIG. 9 is similar to the UI in FIG. 6 with workspace browser portion 902, and editing options 904 operating in a similar fashion.

In the example screenshot, additional columns item is selected prompting a new display frame (908) for editing additional columns to be opened. The display frame 908 shows a listing of available data for additional columns, also referred to flat columns. For each listing, extra information is provided regarding how many of the scorecard elements have valid metadata for that particular attribute. A user may opt not to include a particular attribute as a flat column, if only a minority of scorecard elements have information associated with it.

As mentioned previously, a scorecard application according to embodiments may have the capability to unify flat columns, i.e. combine metadata from different sources that was designated differently in a single column. According to one scenario, the additional column listing may include "owner" and "responsible person". Recognizing these two are the same information, the user may select to combine them in a single flat column in the scorecard matrix. In other embodiments, the scorecard application may perform the combination task dynamically as new data is received.

While the scorecard editor UIs of FIGS. 6, 8, and 9 are shown as a display frame, embodiments are not so limited. Other forms of the UI such as a pop-up display, a hover-over display, a task pane, and a dropdown menu may be implemented using the principles described herein.

Furthermore, the example implementations of scorecards and UIs in FIGS. 5 through 9 are intended for illustration purposes only and should not be construed as a limitation on embodiments. Other embodiments may be implemented without departing from a scope and spirit of the invention.

Figure 10:
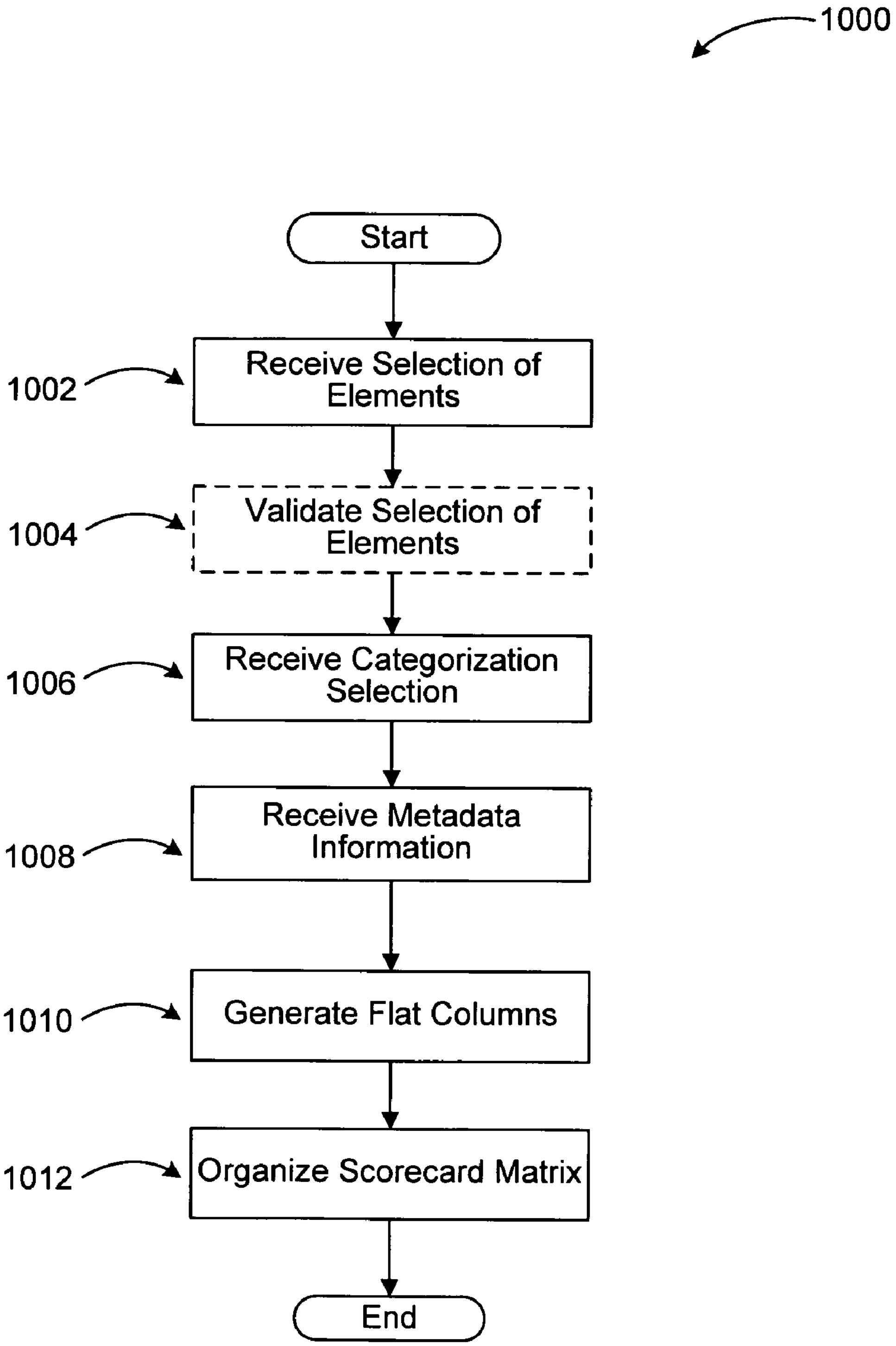
FIG. 10 illustrates a logic flow diagram for a process of categorizing and ordering elements in a scorecard application using header components.

FIG. 10 illustrates a logic flow diagram for a process of categorizing and ordering elements in a scorecard application using header components. Process 1000 may be implemented in a business logic application such as a scorecard application as described in FIGS. 1 and 2.

Process 1000 begins with operation 1002, where a selection of elements is received. Elements may be defined automatically based on a user identity, manually by user request, or a combination of these two methods. As described previously, elements may be selected using a variety of user interface options such as checkbox selection from a preset list, name set selection, query definition, and the like. Typically, hierarchy information is provided along with the element selection (e.g. which KPI reports to which Objective, etc.), but the order of elements may also be defined separately or modified in the scorecard editor UI. Processing moves from operation 1002 to optional operation 1004.

At optional operation 1004, the element selections may be validated. Validation of element selection is especially important when elements are defined using queries. Determining invalid requests before data is attempted to be retrieved may improve an overall efficiency of the scorecard application. Processing advances from optional operation 1004 to operation 1006.

At operation 1006, categorization selections are received. Categorization selections are definition of how selected elements are to be organized in the scorecard matrix. For example, product categories may be ordered as rows, while time dimension is ordered in columns. In another example (see FIG. 5), geographies may be hierarchically ordered in rows, while product categories are organized in columns with multiple layers of headers defining those categories. Depending on the categorization selection, header and row component definitions may be received (automatically or manually from a user) at this stage.

According to some embodiments, the scorecard application may generate layers of header or row component definitions dynamically based on a predetermined set of rules and provide the user an option to modify or redefine them. For example, in the scorecard of FIG. 5, the user may be presented with two default layers of header components for product categories and then asked to change or keep them. Processing moves from operation 1006 to operation 1008.

At operation 1008, metadata information associated with the selected elements is received. Some of the metadata information may be used to define attributes such as owner, last refresh date, and the like. In some scorecard applications, some of the attribute information may be displayed along with the metrics. As described previously, these "flat columns" may be placed next to the metrics columns of dispersed in between different categories of metrics columns. Another operation that may be performed according to embodiments is determining same or similar attribute information and combining them into a single column. Also referred to as "union of headers", this operation enables compatibility of different data sources in a single scorecard. Processing moves from operation 1008 to operation 1010.

At operation 1010, the "flat columns" are generated as determined in the previous operation. As the flat columns (as well as metrics columns) are generated, a localization operation may be performed, where the scorecard application automatically detects an attribute of the underlying data such as currency, geography, etc. and presents a part or the entire scorecard matrix with compatible local settings, as discussed previously. Processing advances from operation 1010 to operation 1012.

At operation 1012, the scorecard matrix is organized as defined in previous operations. Placement of metrics columns according to their categories with corresponding header components and insertion of flat columns is performed at this stage. According to some embodiments, a preview mode may provide a visual representation of what the scorecard may look like in previous operations as selections are made. After operation 1012, processing moves to a calling process for further actions.

The operations included in process 1000 are for illustration purposes. Categorizing and ordering elements using header components in a scorecard application may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for organizing a scorecard matrix, the method comprising:

determining a selection of elements to be included in the scorecard matrix;

determining a categorization for the selected elements;

determining a set of header components for the categorized elements;

determining score values associated with each header component of the set of header components, wherein determining the score values associated with each header component of the set of header component comprises determining one actual score value for each element of the categorized elements and at least one target value for each element of the categorized elements;

providing an option to switch the set of header components with a set of row components;

validating the selection of the elements, wherein validating the selection of the elements comprises:

ensuring data for the scorecard matrix can be efficiently retrieved, and dropping any header components from the set of header components that are not applicable to the scorecard matrix; and generating the scorecard matrix based on the categorized elements using the set of header components to designate categories.

2. The method of claim 1, further comprising:

determining the set of row components for the categorized elements; and generating the scorecard matrix based on the categorized elements using the set of row components to designate the categories, wherein the row components and the header components are interchangeable.

3. The method of claim 2, wherein the row components and the header components categorize the elements by at least one from a set of: a geography, a product, a time, and an organizational structure.

4. The method of claim 2, further comprising:

enabling a user to select the set of row components using one of a checkbox selection, a name set selection, a query definition, and an individual component identification.

5. The method of claim 1, wherein the header components are organized in layers of a predetermined depth based on a number of the categories for the elements.

6. The method of claim 4, further comprising:

presenting a preview of the scorecard matrix as each selection is made; and enabling the user to change a hierarchy of the set of row components and the set of header components.

7. The method of claim 1, further comprising:

determining a selection of at least one flat column, wherein the at least one flat column includes attribute information associated with at least one of the elements; and inserting the selected at least one flat column based on one of a user selection and metrics column categorization into the scorecard matrix.

8. The method of claim 7, wherein the attribute information is retrieved from metadata associated with the selected elements.

9. The method of claim 8, further comprising:

detecting similar attribute information that is designated differently from the metadata; and combining the similar attribute information in a single flat column.

10. The method of claim 1, further comprising:

detecting a localization parameter from at least one of: a user identity, a metrics data attribute, and a scorecard attribute; and adjusting a scorecard presentation and a data presentation based on the localization parameter.

11. The method of claim 10, wherein the localization parameter includes at least one from a set of: a language, a time, a currency, a set of local terms, and numeric value format.

12. The method of claim 10, further comprising:

preserving information associated with at least one from a set of: the selection of the elements, the categorization of the selected elements, selected flat columns, and the localization parameter for subsequent use in another scorecard matrix.

13. The method of claim 1, wherein the set of header components are used in a plurality of scorecard matrices.

14. The method of claim 1, wherein determining the set of header components for the categorized elements comprises determining the set of header components dynamically based on a predetermined set of rules.

15. A computer-readable storage medium having a set of instructions which when executed performs a method for organizing a scorecard matrix in a scorecard system, the method executed by the set of instructions comprising:

determining a selection of elements to be included in the scorecard matrix;

determining a categorization for the selected elements;

determining a set of header components and a set of row components for the categorized elements;

determining score values associated with each header component of the set of header components, wherein determining the score values associated with each header component of the set of header component comprises determining one actual score value for each element of the categorized elements and at least one target value for each element of the categorized elements;

providing an option to switch the set of header components with the set of row components, wherein the set of header components and the set of row components are interchangeable;

validating a combination of the set of header components and the set of row components to prevent a conflict in data retrieval and scorecard presentation;

dropping any header components from the set of header components that are not applicable to the scorecard matrix; and generating the scorecard matrix based on the categorized elements using the set of header components and the set of row components to designate categories, wherein the categories include at least one from a set of: a geography, a product, a time, and an organizational structure.

16. The computer-readable storage medium claim 15, wherein determining the set of header components and the set of row components for the categorized elements comprises determining the set of header components and the set of row dynamically based on a predetermined set of rules.

17. A system for editing a scorecard matrix using header components in a scorecard system, the system comprising:

a memory storage; and a processing unit coupled to the memory storage, wherein the processing unit is operative to provide:

a scorecard application configured to compute scorecard metrics and provide a scorecard presentation based on computed scorecard metrics; and an editing user interface (UI) configured to:

determine a group of categories for a selected group of scorecard elements;

determine a set of layered header components and a set of row components based on the group of categories, wherein a depth of header component layers is determined by a user selection from a default set of layers;

determine at least one flat column associated with an attribute of at least one scorecard metric;

determine one actual score value for the at least one scorecard metric;

determine at least one target for the at least one scorecard metric;

provide an option to switch the set of header components with the set of row components;

validate a combination of the set of layered header components and the set of row components to prevent a conflict in data retrieval and the scorecard presentation;

ensure data for the scorecard matrix can be efficiently retrieved, wherein the editing UI being configured to ensure the data for the scorecard matrix can be efficiently retrieved comprises the editing UI being configured to perform a validation operation to ensure that the data can be retrieved without degenerate queries and remove redundant query elements; and drop any header components from the set of layered header components that are not applicable to the scorecard matrix, wherein dropping any header components that are not applicable to the scorecard matrix comprises the editing UI being configured to:

determine whether at least one layered header component of the set of layered header components has at least one selected metric associated with the at least one layered header component, and in response to determining that the at least one layered header component of the set of layered header components does not have the at least one selected metric associated with the at least one layered header component, dropping the at least one header component from the set of layered header components;

switch, upon user switch indication and validation of the combination of the set of header components and the set of row components resultant from the switch, the set of header components with the set of row components; and generate the scorecard matrix based on the group of categories and the at least one flat column for the scorecard presentation.

18. The system of claim 17, wherein the editing UI is further configured to dynamically combine similar attributes that are designated differently in their respective data sources into a single flat column.

19. The system of claim 17, wherein the editing UI is further configured to present scorecard elements associated with a selected header component in the scorecard presentation and to hide the scorecard elements associated with an unselected header component in the scorecard presentation.

20. The system of claim 17, wherein the editing UI is configured to detect a localization parameter from one of a browser configuration, a user identity, a data attribute, and adjust at least one from a set of: a UI language, a data format, a time format, a currency, and a set of local terms based on the detected localization parameter.

* * * * *